United States Patent
Khandekar et al.

(10) Patent No.: US 8,457,315 B2
(45) Date of Patent: Jun. 4, 2013

(54) PILOT TRANSMISSION IN A WIRELESS COMMUNICATION SYSTEM

(75) Inventors: Aamod Khandekar, San Diego, CA (US); Alexei Gorokhov, San Diego, CA (US); Mohammad J. Borran, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

(21) Appl. No.: 11/968,636

(22) Filed: Jan. 2, 2008

(65) Prior Publication Data

US 2008/0165969 A1    Jul. 10, 2008

Related U.S. Application Data

(60) Provisional application No. 60/883,982, filed on Jan. 8, 2007, provisional application No. 60/883,870, filed on Jan. 8, 2007, provisional application No. 60/883,758, filed on Jan. 5, 2007.

(51) Int. Cl.
*H04L 29/06* (2006.01)

(52) U.S. Cl.
USPC ........... 380/270; 713/168; 713/169; 713/170; 713/171

(58) Field of Classification Search
USPC .......................................................... 380/270
See application file for complete search history.

(56) References Cited

U.S. PATENT DOCUMENTS

| | | | |
|---|---|---|---|
| 4,926,416 A | 5/1990 | Weik | |
| 5,864,577 A | 1/1999 | Ramel | |
| 5,896,357 A | 4/1999 | Shinozaki et al. | |
| 6,278,685 B1 | 8/2001 | Yonge, III | |
| 6,400,699 B1 | 6/2002 | Airy et al. | |
| 6,768,713 B1 | 7/2004 | Siala et al. | |
| 6,845,104 B2 | 1/2005 | Johnson et al. | |

(Continued)

FOREIGN PATENT DOCUMENTS

| | | |
|---|---|---|
| CA | 2605556 A1 | 12/2006 |
| EP | 0650304 A2 | 4/1995 |

(Continued)

OTHER PUBLICATIONS

3GPP2 C.S0084-001, Version 2, Physical Layer for Ultra Mobile Broadband (UMB) Air Interface Specification, Aug. 2007.

(Continued)

*Primary Examiner* — Longbit Chai
(74) *Attorney, Agent, or Firm* — Peng Zhu

(57) ABSTRACT

Techniques for transmitting pilot and traffic data are described. In one aspect, a terminal may scramble its pilot with a scrambling sequence generated based on a set of static and dynamic parameters. The static parameter(s) have fixed value for an entire communication session for the terminal. The dynamic parameter(s) have variable value during the communication session. The terminal may generate a scrambling sequence by hashing the set of parameters to obtain a seed and initializing a PN generator with the seed. The terminal may then generate the pilot based on the scrambling sequence. In another aspect, the terminal may use different scrambling sequences for pilot and traffic data. A first scrambling sequence may be generated based on a first set of parameters and used to generate the pilot. A second scrambling sequence may be generated based on a second set of parameters and used to scramble traffic data.

49 Claims, 10 Drawing Sheets

U.S. PATENT DOCUMENTS

| | | | |
|---|---|---|---|
| 6,928,066 B1* | 8/2005 | Moon et al. | 370/342 |
| 7,242,722 B2 | 7/2007 | Krauss et al. | |
| 7,554,948 B2 | 6/2009 | Naguib et al. | |
| 2004/0062321 A1* | 4/2004 | Nakamura et al. | 375/295 |
| 2005/0120097 A1 | 6/2005 | Walton et al. | |
| 2005/0135324 A1 | 6/2005 | Kim et al. | |
| 2005/0163194 A1 | 7/2005 | Gore et al. | |
| 2006/0109810 A1 | 5/2006 | Au et al. | |
| 2006/0209973 A1* | 9/2006 | Gorokhov et al. | 375/260 |
| 2006/0285503 A1 | 12/2006 | Mese et al. | |
| 2007/0009054 A1 | 1/2007 | Kwak et al. | |
| 2008/0019314 A1* | 1/2008 | Gorokhov et al. | 370/330 |
| 2008/0166969 A1 | 7/2008 | Gorokhov et al. | |
| 2008/0167040 A1 | 7/2008 | Khandekar et al. | |
| 2008/0240159 A1 | 10/2008 | Palanki et al. | |
| 2012/0218943 A1 | 8/2012 | Khandekar et al. | |

FOREIGN PATENT DOCUMENTS

| | | |
|---|---|---|
| EP | 0917305 A2 | 5/1999 |
| EP | 1289328 | 3/2003 |
| JP | 10502507 | 3/1998 |
| JP | 2005333677 A | 12/2005 |
| JP | 2006203355 A | 8/2006 |
| JP | 2006311465 A | 11/2006 |
| JP | 2008546316 | 12/2008 |
| JP | 2008547252 A | 12/2008 |
| KR | 20000026410 A | 5/2000 |
| RU | 99126427 | 10/2001 |
| RU | 2187205 C2 | 8/2002 |
| RU | 2191477 | 10/2002 |
| RU | 2242091 C2 | 12/2004 |
| RU | 2250564 | 4/2005 |
| RU | 2257008 | 7/2005 |
| RU | 2282943 C2 | 8/2006 |
| WO | WO9852326 A2 | 11/1998 |
| WO | WO0013427 A2 | 3/2000 |
| WO | WO0101596 | 1/2001 |
| WO | WO0117125 A1 | 3/2001 |
| WO | WO0126269 | 4/2001 |
| WO | 02058300 | 7/2002 |
| WO | WO03001741 A1 | 1/2003 |
| WO | WO03032564 | 4/2003 |
| WO | WO2005046259 A2 | 5/2005 |
| WO | WO2005076552 | 8/2005 |
| WO | WO2006002658 A1 | 1/2006 |
| WO | WO2006046894 A1 | 5/2006 |
| WO | WO2006125150 A2 | 11/2006 |
| WO | WO2006130742 | 12/2006 |
| WO | WO2006133598 A1 | 12/2006 |
| WO | WO2006137708 | 12/2006 |
| WO | WO2007146930 | 12/2007 |
| WO | 2008031111 | 3/2008 |

OTHER PUBLICATIONS

3GPP2 C.S0084-002, Version 2, "Medium Access Control Layer for Ultra Mobile Broadband (UMB) Air Interface Specification," Aug. 2007.

IEEE 802.11, IEEE Wireless LAN Edition, A Compilation Based on IEEE Std. 802.11-1999 (R2003) and its Amendments.

IEEE Std. 802.16-2004, Part 16: Air Interface for Fixed Broadband Wireless Access Systems.

International Search Report—PCT/US08/050328, International Search Authority—European Patent Office, Jun. 19, 2008.

Written Opinion—PCT/US08/050328, International Search Authority—European Patent Office, Jun. 19, 2008.

802.16e-2005 and IEEE Std 802.16-2004/Cor1-2005; Section 8.4.6.1.1 Preamble, Published 2006 IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1.

IEEE Std. 802.20, 802.20/D0.2m, Jun. 2007, Draft Standard for Local and Metropolitan Area Networks—Standard Air Interface for Mobile Broadband Wireless Access Systems Supporting Vehicular Mobility—Physical and Media Access Control Layer Specification.

International Search Report—PCT/US08/050080—International Search Authority, European Patent Office, May 27, 2008.

International Search Report—PCT/US08/050179, International Search Authority—European Patent Office, Jun. 19, 2008.

International Search Report—PCT/US08/050187—International Search Authority, European Patent Office, Jul. 29, 2008.

Written Opinion—PCT/US08/050080, International Search Authority, European Patent Office, May 27, 2008.

Written Opinion—PCT/US08/050179, International Search Authority—European Patent Office, Jun. 19, 2008.

Written Opinion—PCT/US08/050187—International Search Authority, European Patent Office, Jul. 29, 2008.

Taiwan Search Report—TW097100638—TIPO—Jun. 13, 2011.

* cited by examiner

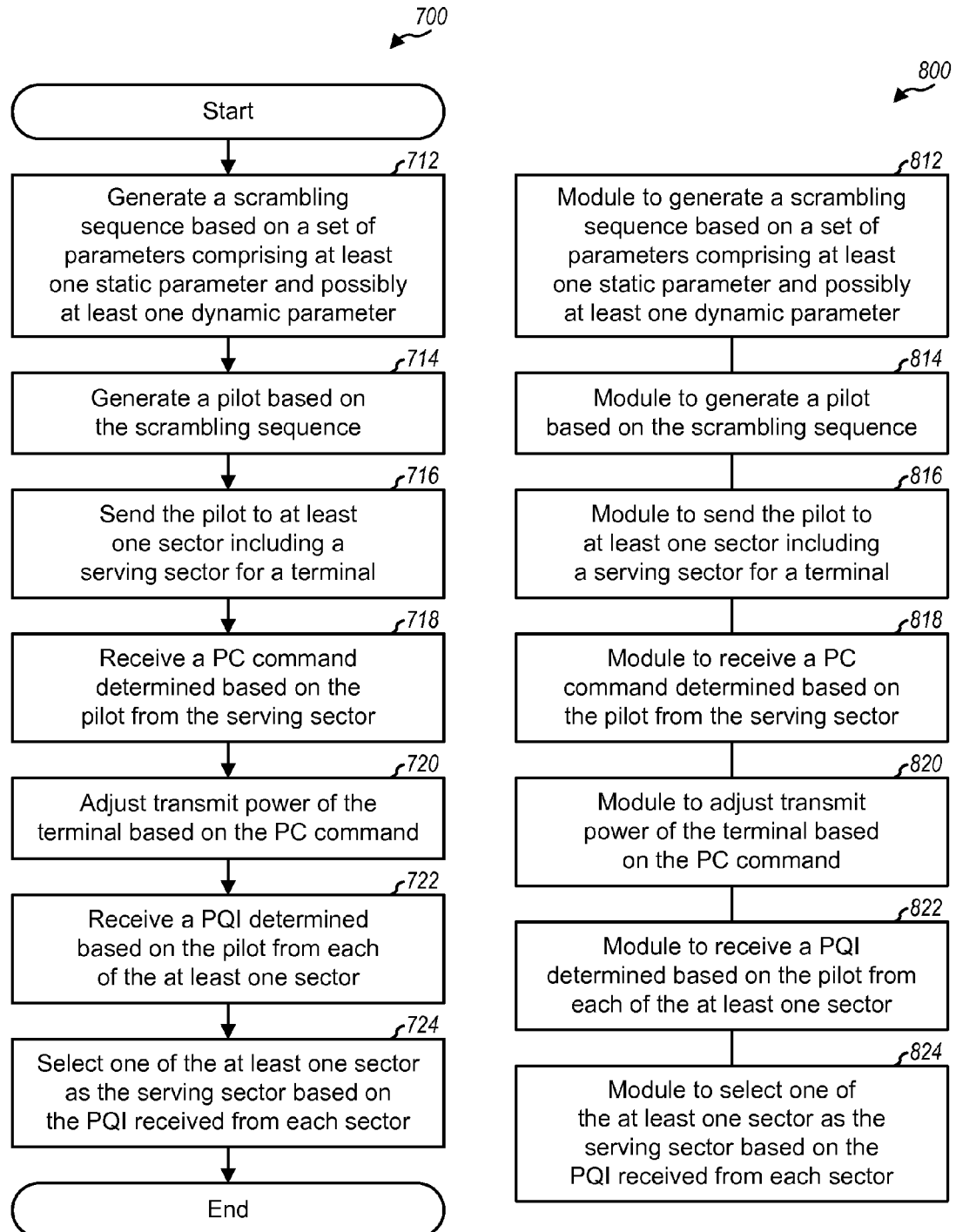

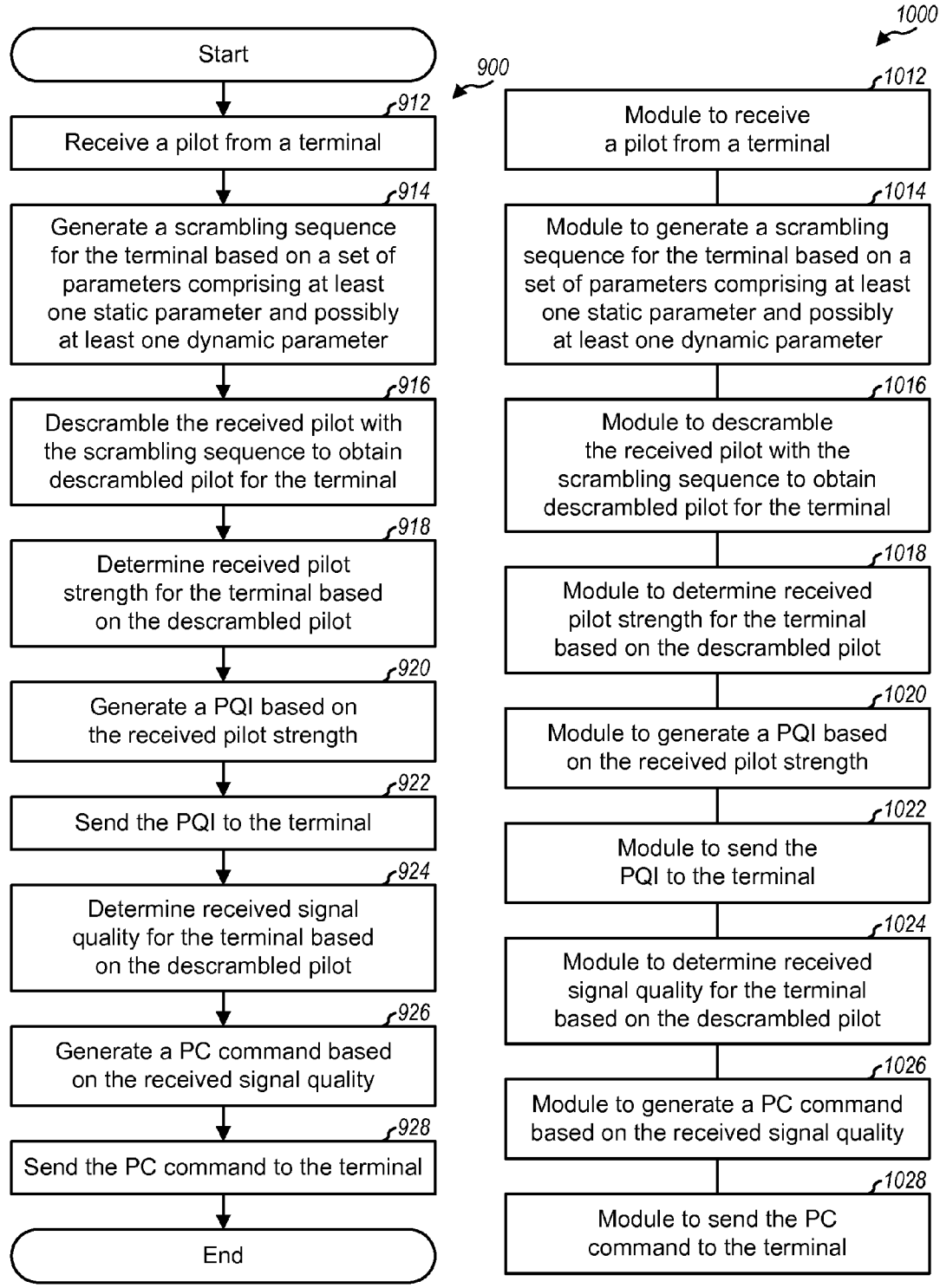

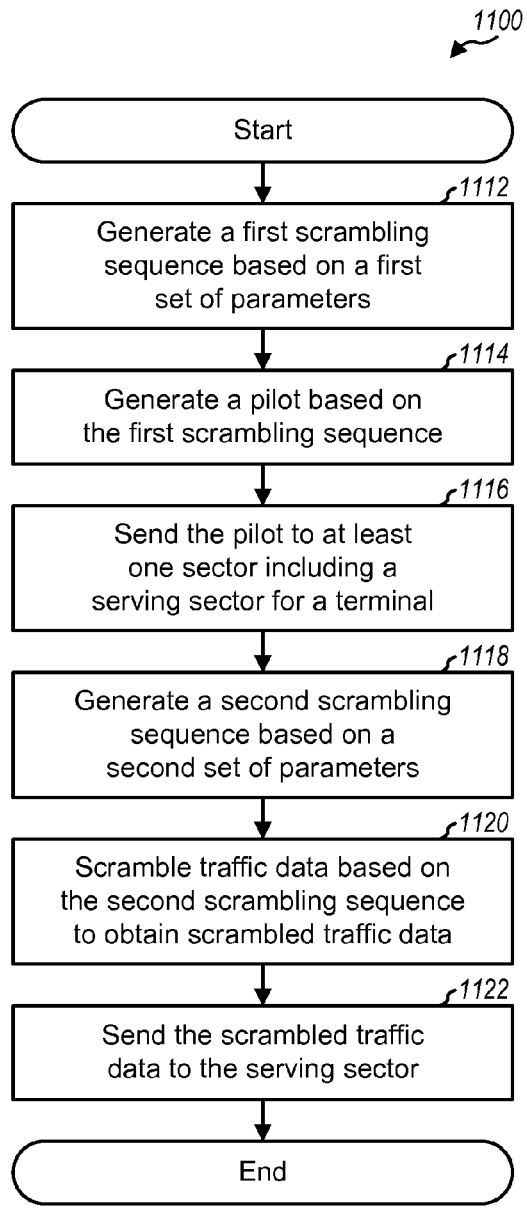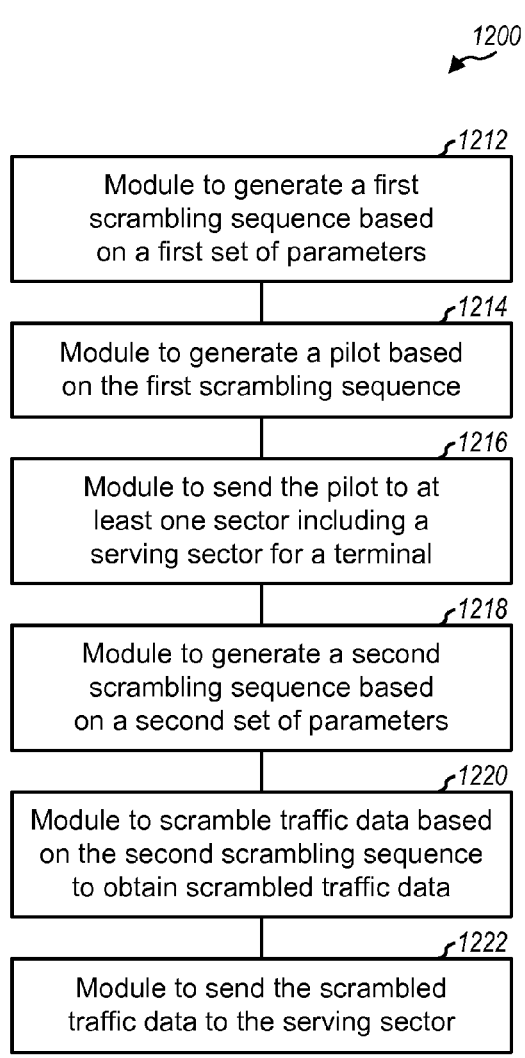
FIG. 11
FIG. 12

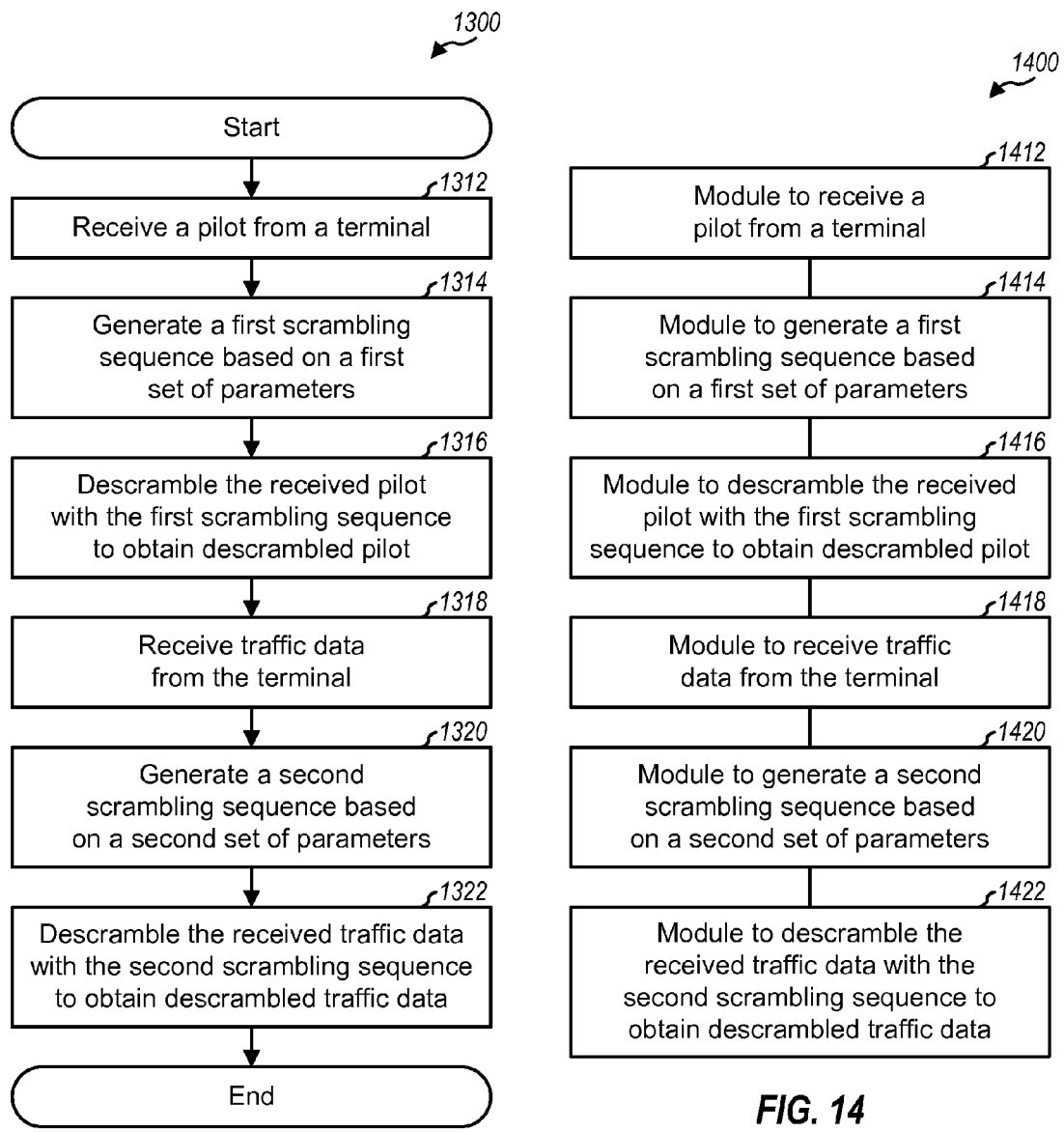

PILOT TRANSMISSION IN A WIRELESS COMMUNICATION SYSTEM

The present application claims priority to provisional U.S. Application Ser. No. 60/883,758, entitled "WIRELESS COMMUNICATION SYSTEM," filed Jan. 5, 2007, provisional U.S. Application Ser. No. 60/883,870, entitled "PILOT SIGNAL TRANSMISSION FOR A WIRELESS COMMUNICATION SYSTEM," filed Jan. 8, 2007, and provisional U.S. Application Ser. No. 60/883,982, entitled "PILOT SIGNAL TRANSMISSION FOR A WIRELESS COMMUNICATION SYSTEM," filed Jan. 8, 2007, all assigned to the assignee hereof and incorporated herein by reference.

BACKGROUND

I. Field

The present disclosure relates generally to communication, and more specifically to techniques for transmitting pilot in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include many base stations that can support communication for many terminals on the forward and reverse links. The forward link (or downlink) refers to the communication link from the base stations to the terminals, and the reverse link (or uplink) refers to the communication link from the terminals to the base stations. The terminals may be located anywhere within the system, and each terminal may be within the coverage of zero, one, or multiple base stations at any given moment. A terminal may transmit a pilot on the reverse link to allow the base stations to detect the terminal. The pilot may also be used to estimate the channel conditions for the terminal, to assign the terminal to an appropriate base station that can efficiently serve the terminal, and/or for other purposes. The pilot transmitted by the terminal, although useful, represents overhead.

There is therefore a need in the art for techniques to efficiently transmit pilot on the reverse link.

SUMMARY

Techniques for transmitting pilot and traffic data by a terminal on the reverse link are described herein. In one aspect, the terminal may scramble its pilot with a scrambling sequence generated based on a set of parameters, which may include at least one static parameter and possibly at least one dynamic parameter. The at least one static parameter may have fixed value for an entire communication session for the terminal, may be determined during initial system access by the terminal, and may be independent of a serving sector for the terminal. The at least one dynamic parameter may have variable value during the communication session and may include a parameter for system time. A scrambling sequence may be generated based on the set of parameters, e.g., by hashing the set of parameters to obtain a seed and then initializing a pseudo-random number (PN) generator with the seed. A pilot may then be generated based on the scrambling sequence, e.g., by scrambling pilot data with the scrambling sequence to obtain scrambled pilot data and then generating pilot symbols based on the scrambled pilot data.

In another aspect, the terminal may use different scrambling sequences for pilot and traffic data. A first scrambling sequence may be generated based on a first set of parameters. A pilot may be generated based on the first scrambling sequence and may be sent to at least one sector including the serving sector. A second scrambling sequence may be generated based on a second set of parameters. Traffic data may be scrambled based on the second scrambling sequence to obtain scrambled traffic data, which may be sent to the serving sector. The first set may include at least one parameter independent of the serving sector. The second set may include at least one parameter dependent on the serving sector. The first and second sets may each include a dynamic parameter, e.g., a parameter for system time.

Various aspects and features of the disclosure are described in further detail below.

BRIEF DESCRIPTION OF THE DRAWINGS

FIG. 7 shows a process for transmitting pilot by the terminal.

FIG. 8 shows an apparatus for transmitting pilot.

FIG. 9 shows a process for receiving pilot by a sector/base station.

FIG. 10 shows an apparatus for receiving pilot.

FIG. 11 shows a process for transmitting pilot and traffic data by the terminal.

FIG. 12 shows an apparatus for transmitting pilot and traffic data.

FIG. 13 shows a process for receiving pilot and traffic data by a sector.

FIG. 14 shows an apparatus for receiving pilot and traffic data.

DETAILED DESCRIPTION

Figure 1:
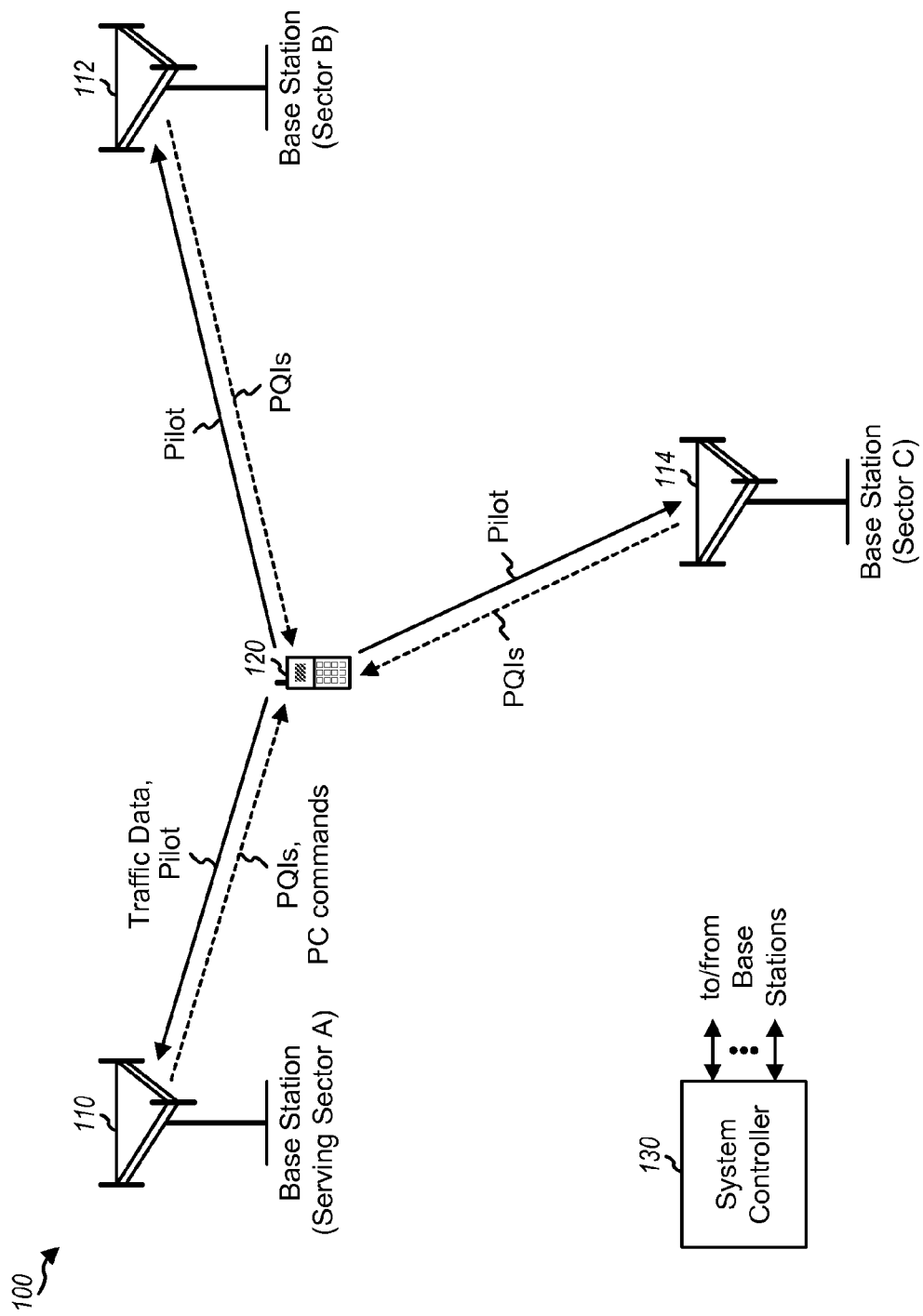
FIG. 1 shows a wireless communication system.

FIG. 1 shows a wireless communication system 100 with multiple base stations. A wireless system may also be referred to as an access network (AN). The terms "system" and "network" are often used interchangeably. For simplicity, only three base stations 110, 112 and 114 are shown in FIG. 1. A base station is a station that communicates with the terminals. A base station may also be referred to as an access point (AP), a Node B, an evolved Node B, etc. Each base station provides communication coverage for a particular geographic area. The term "cell" can refer to a base station and/or its coverage area depending on the context in which the term is used. To improve system capacity, a base station coverage area may be partitioned into multiple (e.g., three) smaller areas. Each smaller area may be served by a respective base station subsystem. The term "sector" can refer to the smallest coverage area of a base station and/or a base station subsystem serving this coverage area. The techniques described herein may be used for a system with sectorized cells as well as a system with un-sectorized cells. For clarity, the techniques are described below for a system with sectorized cells. In the following description, the terms "sector" and "base station" are used interchangeably. Base stations 110, 112 and 114 correspond to sectors A, B and C, respectively.

For a centralized architecture, a system controller 130 may couple to the base stations and provide coordination and control for these base stations. System controller 130 may be a single network entity or a collection of network entities. For a distributed architecture, the base stations may communicate with one another as needed.

A terminal 120 may be located anywhere within the system and may be stationary or mobile. Terminal 120 may also be referred to as an access terminal (AT), a mobile station, a user equipment, a subscriber unit, a station, etc. Terminal 120 may be a cellular phone, a personal digital assistant (PDA), a wireless communication device, a wireless modem, a handheld device, a laptop computer, a cordless phone, etc. Terminal 120 may communicate with zero, one, or multiple sectors on the forward and/or reverse link at any given moment. Terminal 120 may have a serving sector designated to serve the terminal on the forward and/or reverse link. Terminal 120 may also have an active set containing sectors that might be able to serve the terminal. In the example shown in FIG. 1, sector A is the serving sector for terminal 120, and sectors B and C are in the active set of terminal 120.

The techniques described herein may be used for various wireless communication systems such as CDMA, TDMA, FDMA, OFDMA and SC-FDMA systems. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.11, IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

For clarity, certain aspects of the techniques are described below for UMB, and UMB terminology is used in much of the description below. UMB utilizes a combination of orthogonal frequency division multiplexing (OFDM) and code division multiplexing (CDM). UMB is described in 3GPP2 C.S0084-001, entitled "Physical Layer for Ultra Mobile Broadband (UMB) Air Interface Specification," and 3GPP2 C.S0084-002, entitled "Medium Access Control Layer For Ultra Mobile Broadband (UMB) Air Interface Specification," both dated August 2007 and publicly available.

Figure 2:
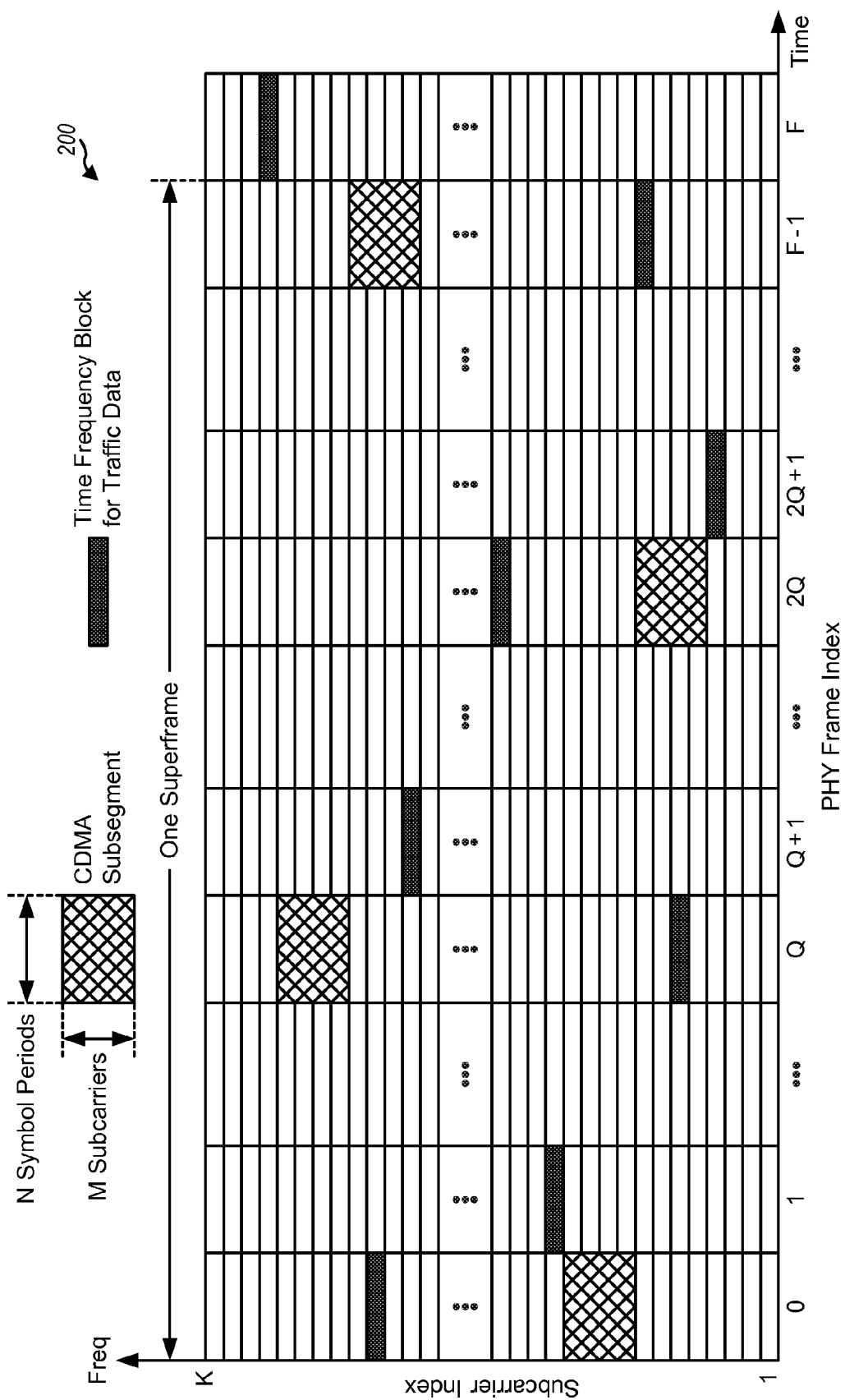
FIG. 2 shows a superframe structure for the reverse link.

FIG. 2 shows a design of a superframe structure 200 that may be used for the reverse link. The transmission timeline may be partitioned into units of superframes. Each superframe may span a particular time duration, which may be fixed or configurable. Each superframe may be partitioned into F physical layer (PHY) frames, where in general $F \geq 1$. In one design, F=25, and the 25 PHY frames in each superframe are assigned indices of 0 through 24. Each PHY frame may cover N OFDM symbol periods, where in general $N \geq 1$ and in one design N=8.

FIG. 2 also shows a subcarrier structure. The system bandwidth may be partitioned into multiple (K) orthogonal subcarriers, which may also be referred to as tones, bins, etc. The spacing between adjacent subcarriers may be fixed, and the number of subcarriers may be dependent on the system bandwidth. For example, there may be 128, 256, 512, 1024 or 2048 subcarriers for system bandwidth of 1.25, 2.5, 5, 10 or 20 MHz, respectively.

FIG. 2 also shows a design of a CDMA segment that can support transmission of pilot, signaling, and some traffic data on the reverse link. The CDMA segment may support various channels such as, e.g., a Reverse Pilot Channel (R-PICH), a Reverse CDMA Dedicated Control Channel (R-CDCCH), a Reverse Access Channel (R-ACH), a Reverse CDMA Data Channel (R-CDCH), etc.

The CDMA segment may occupy a block of time frequency resources that may be of any dimension. In one design, the CDMA segment includes S CDMA subsegments, where in general $S \geq 1$. Each CDMA subsegment may cover M contiguous subcarriers in N OFDM symbol periods and may include L=M N transmission units. A transmission unit may correspond to one subcarrier in one OFDM symbol period. In one design, each CDMA subsegment covers 128 contiguous subcarriers in 8 OFDM symbol periods of one PHY frame and includes 1024 transmission units. The CDMA segment and subsegment may also have other sizes.

In the design shown in FIG. 2, the CDMA segment is sent in every Q PHY frames, where in general $Q \geq 1$ and as some examples Q=4, 6, 8, etc. The CDMA segment may hop across the system bandwidth from CDMA frame to CDMA frame (as shown in FIG. 2) or may be sent on a fixed set of subcarriers (not shown in FIG. 2). A CDMA frame is a PHY frame in which the CDMA segment is sent. In general, the CDMA segment may be sent at any rate and in a time frequency block of any dimension. Multiple terminals may share the CDMA segment for pilot, signaling, etc. This may be more efficient than assigning dedicated time frequency resources to each terminal for sending pilot and signaling on the reverse link.

In an aspect, terminal 120 may transmit a pilot on the reverse link such that the pilot can be received by all sectors designated to receive the pilot, e.g., all sectors in the active set of terminal 120. In one design, this may be achieved by scrambling the pilot with a scrambling sequence that is known by all designated sectors. Terminal 120 may scramble the pilot such that the pilot is unique for terminal 120 among the pilots of all terminals in a given sector. This would then allow the sector to receive and identify the pilot from terminal 120. Furthermore, terminal 120 may scramble the pilot such that the pilot is not specific to any sector. This would then allow the pilot from terminal 120 to be received by all designated sectors. This would also allow terminal 120 to transmit the same pilot even when terminal 120 moves about the system and is handed off from sector to sector.

In one design, the scrambling sequence for the pilot may be generated based on a set of parameters that may be used to identify terminal 120 and/or to minimize collision with other terminals. In general, any set of parameters may be used to generate the scrambling sequence for the pilot. The set may include only static parameters, or only dynamic parameters, or both static and dynamic parameters. A static parameter is a parameter whose value does not change during a communication session for a terminal, even if the terminal is handed off from sector to sector. A static parameter may also be referred to as a session parameter and may be part of session state information for the terminal. A dynamic parameter is a parameter whose value can change during a communication session.

In one design, the set of parameters for the scrambling sequence for the pilot may include the parameters given in Table 1.

TABLE 1

Parameters for scrambling sequence for pilot

| Parameter | Length | Description |
|---|---|---|
| PilotID | 10 bits | Identifier (ID) of a sector via which terminal 120 initially accessed the system. |
| MACID | 11 bits | ID assigned to terminal 120 by the initial accessed sector. |
| AccessSequenceID | 10 bits | Index of an access sequence sent by terminal 120 for the initial system access. |
| Access time | 18 bits | Time of initial system access by terminal 120. |
| System time | 15 bits | Time at which the pilot is transmitted by terminal 120. |

The PilotID may also be referred to as, or may comprise, a sector ID, a PilotPN, etc. Each sector may transmit a pilot on the forward link and may scramble this pilot with a scrambling sequence assigned to that sector. The PilotPN may be an index for the scrambling sequence used by the sector. Other forms of sector ID may also be used for the set of parameters for the scrambling sequence for the pilot.

The Medium Access Control ID (MACID) may also be referred to as, or may comprise, a terminal ID, a Radio Network Temporary Identifier (RNTI), etc. Each sector may assign a unique MACID to each terminal communicating with that sector. Each terminal may then be uniquely identified by its assigned MACID for communication with the sector. Terminal 120 may be assigned a MACID by a given sector upon accessing the sector, upon being handed off to the sector, upon adding the sector to the active set, etc. Terminal 120 may use the assigned MACID for the duration of time in which terminal 120 is in communication with the sector. The assigned MACID may be de-assigned when terminal 120 leaves the sector, when the sector is removed from the active set, etc. The MACID assigned by the initial accessed sector may not be valid for communication with other sectors but may nevertheless be used to identify the pilot from terminal 120. Other forms of terminal ID may also be used for the set of parameters for the scrambling sequence.

The access sequence index may be used to identify terminal 120 for the initial system access, before a MACID is assigned to terminal 120. Terminal 120 may randomly select the access sequence index and may send the corresponding access sequence on the R-ACH to access the system. The access sequence may also be referred to as an access signature, an access probe, a random access probe, a signature sequence, etc.

The access time may be defined in various manners. For example, the access time may be the time at which terminal 120 sends the access sequence on the reverse link, the time at which a sector sends an access grant to terminal 120 on the forward link, etc. The access time may also be given in various formats. In one design, the access time may be given by a particular number of least significant bits (e.g., 18 LSBs) of a frame index for the time of initial system access by terminal 120. In another design, the access time may be given by a particular number of LSBs (e.g., 9 LSBs) of a superframe index and a frame index (e.g., 5 or 6 bits) of a frame within a superframe when the initial system access occurred.

The system time may be the time of transmission and may also be referred to as current time, current system time, transmission time, etc. The system time may be given in various formats. In one design, the system time may be given by a particular number of LSBs (e.g., 9 LSBs) of a superframe index and a frame index (e.g., 6 bits) of a frame within a superframe when the transmission occurs. The system time may also be given in other formats.

In the design shown in Table 1, the PilotID, the MACID, the AccessSequenceID, and the access time may be static parameters, and the system time may be a dynamic parameter. The static parameters may be obtained during initial system access and may be available at both the terminal and the accessed sector right after the initial system access is complete. Thus, transmission and reception of pilot may commence as soon as the initial system access is complete, and does not require any additional messaging or configuration or any exchange of data packets. The static parameters may also be obtained during call setup, handoff, etc. The set of static parameters in Table 1 may result in high likelihood of uniqueness of pilot scrambling among different terminals and may reduce the likelihood of collisions among different terminals.

Table 1 shows an example set of parameters and an example size for each parameter, in accordance with one specific design. The parameters in Table 1 may have other sizes. Other static and/or dynamic parameters may also be used to generate the scrambling sequence for the pilot. For example, the R-PICH or CDMA subsegment may hop across the system bandwidth based on a hopping pattern, and a dynamic parameter may be defined based on the frequency resources used for the R-PICH or CDMA subsegment.

Other combinations of parameters may also be used to generate the scrambling sequence for the pilot. For example, the scrambling sequence may be generated based on (i) a combination of PilotID, MACID, and system time, (ii) a combination of MACID, access time, and system time, or (iii) some other combination of parameters. In another design, the scrambling sequence may be generated based on a static value (e.g., a pseudo-random value) assigned by the initial accessed sector or selected by terminal 120 and the system time.

The static parameters may be provided to each sector designated to receive the pilot from terminal 120, e.g., each new sector added to the active set of terminal 120. Other session state information may also be communicated to the new sector upon being added to the active set. The dynamic parameter(s) may be known to each sector and may not have to be sent to the new sector.

The set of parameters used to generate the scrambling sequence for the pilot should uniquely identify terminal 120 with sufficiently high probability. This may ensure that the likelihood of the pilots from two terminals using the same scrambling sequence and colliding is negligible. The desired probability of uniqueness may be achieved by using a sufficient number of parameters with a sufficient number of bits. In general, any set of parameters may be used to uniquely identify terminal 120 with sufficiently high probability. The set of parameters may be made available to all designated sectors so that these sectors can receive the pilot from terminal 120. The set of parameters may be sent via a backhaul to each new sector or via signaling from terminal 120 to each new sector.

The scrambling sequence for the pilot may be generated based on the set of parameters in various manners. In one design, the set of parameters may be used directly as a seed for a PN generator, which may implement a particular generator polynomial. In another design, the set of parameters may be hashed with a hash function to obtain a seed for the PN generator. The hash function may map the set of parameters to a pseudo-random seed and may provide the seed with fewer bits than the set of parameters.

In one design, the set of parameters includes the PilotID (e.g., 10 bits), the MACID (e.g., 11 bits), the access sequence index (e.g., 10 bits), the access time (e.g., 18 bits), and the system time (e.g., 15 bits). This set of parameters may be hashed to obtain a fixed-size seed (e.g., 20 bits). Other combinations of parameters and/or parameter sizes may also be used to generate the seed, which may also have other sizes. The size of the seed may be selected based on the desired probability of collision between different terminals. For a 20-bit seed, the probability of two terminals having the same seed is equal to $2^{-20}$, which is approximately $10^{-6}$. If there are 1000 terminals in one sector, then the probability of the scrambling sequence of a given terminal colliding with the scrambling sequence of any remaining terminal is $10^{-3}$. This collision probability may be sufficiently low and may have negligible impact on system performance.

The use of a dynamic parameter to generate the scrambling sequence may reduce the likelihood of repeated collisions between the pilots from two terminals. For example, a first set of static and dynamic parameters for a first terminal may be hashed to the same digest as a second set of static and dynamic parameters for a second terminal, even although these two parameter sets are different, due to the random nature of the hash function. The dynamic parameter may be system time, which would change for each pilot transmission instance, thus ensuring a different set of parameters input to the hash function. The hash function input therefore changes from pilot transmission instance to pilot transmission instance, and is further different for different terminals due to the presence of the static parameters. As a result, the hash output is different for each terminal and for each pilot transmission instance, thus reducing the likelihood of repeated collisions. If the scrambling sequences of two terminals collide in one pilot transmission instance, then these scrambling sequences will likely not collide in the next pilot transmission instance. The likelihood of collision in each pilot transmission instance may be an independent event with a probability of $10^{-6}$ due to the use of system time as one of the inputs to the hash function.

The hashing also allows for use of a shorter length PN generator for the scrambling sequence, which may simplify implementation. The PN generator may be initialized with the seed and may then be operated to generate the scrambling sequence for the pilot.

The pilot from terminal 120 may be used for various purposes. Serving sector 110 may use the pilot as a reference signal to estimate the received signal quality for terminal 120. Serving sector 110 may determine power control (PC) commands based on the received signal quality and may send the PC commands on a Forward Power Control Channel (F-PCCH) to terminal 120. Terminal 120 may adjust its transmit power or transmit power density (PSD) based on the PC commands. The pilot from terminal 120 may thus be used as a reference to set the power levels of data and control channels sent by terminal 120.

All sectors in the active set of terminal 120 may receive the pilot from terminal 120 and determine the strength at which the pilot is received. Each sector in the active set may determine a pilot quality indicator (PQI) based on the received pilot strength and may send the PQI on a Forward PQI Channel (F-PQICH) to terminal 120. Terminal 120 may use the PQIs from all sectors in the active set to determine which sector has the best reverse link (e.g., the highest received pilot strength) for terminal 120 and may use this information to make decisions for handoff on the reverse link.

Terminal 120 may also scramble traffic data sent to the serving sector and may use a scrambling sequence that is specific to the serving sector. In one design, the scrambling sequence for traffic data may be generated based on a set of parameters given in Table 2.

TABLE 2

Parameters for scrambling sequence for traffic data

| Parameter | Length | Description |
|---|---|---|
| PilotID | 10 bits | ID of the serving sector for terminal 120. |
| MACID | 11 bits | ID assigned to terminal 120 by the serving sector. |
| System time | 10 bits | Time at which traffic data is transmitted by terminal 120. |

The PilotID and MACID in Table 2 are related to the serving sector and may be different from the PilotID and MACID in Table 1, which are related to the initial access sector. This may be the case if terminal 120 has been handed off from the initial accessed sector to the current serving sector. The system time may be given in various formats. In one design, the system time may be given by 4 LSBs of a superframe index and a 6-bit frame index of a frame within a superframe in which traffic data is transmitted.

Table 2 shows an example set of parameters and an example size for each parameter, in accordance with one specific design. These parameters may have other sizes. Other parameters may also be used to generate the scrambling sequence for traffic data. For example, a packet format index for a packet may be used as a parameter for the scrambling sequence for traffic data. Other combinations of parameters may also be used for the scrambling sequence for traffic data.

Figure 3:
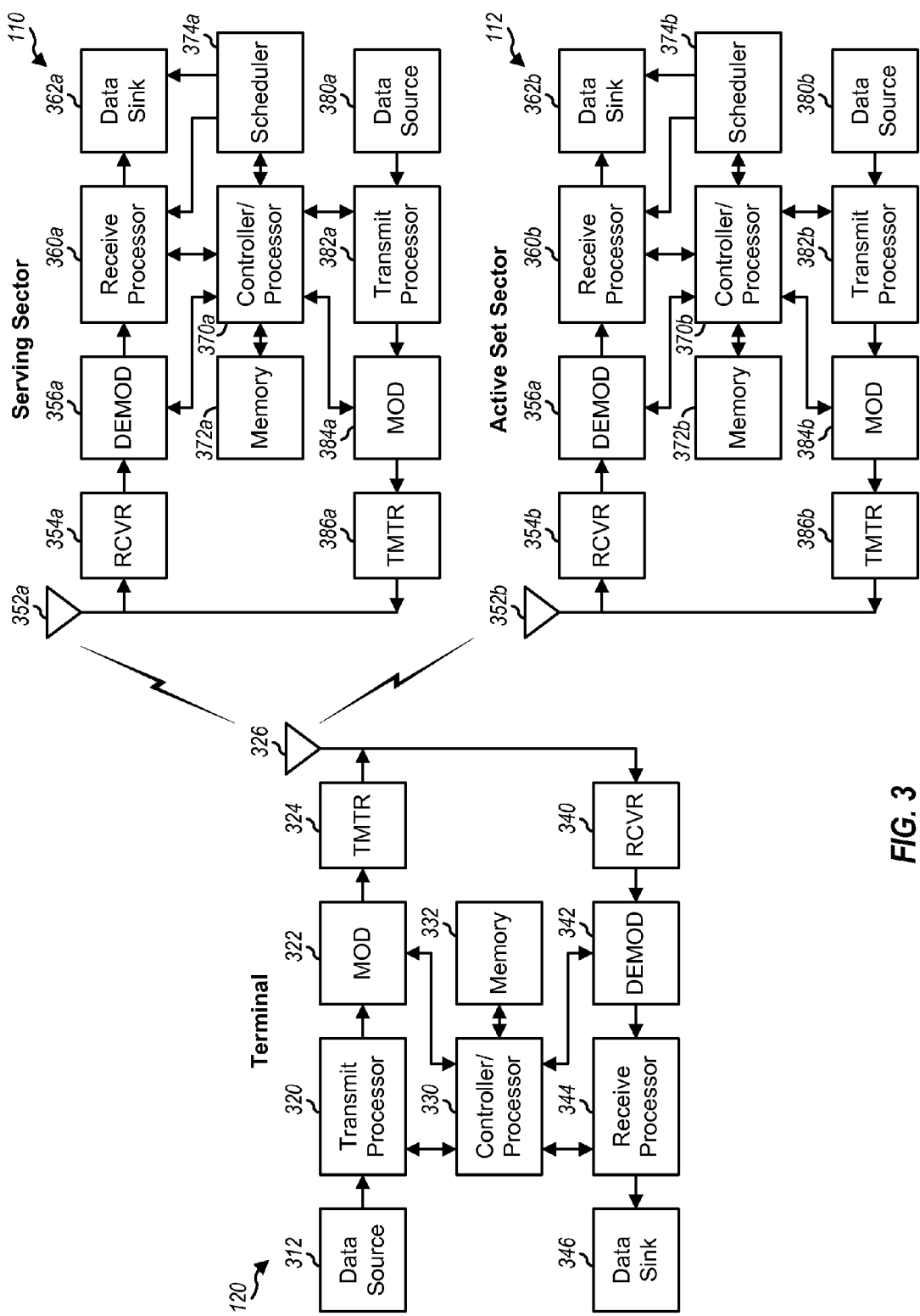
FIG. 3 shows a block diagram of a terminal and two sectors/base stations.

FIG. 3 shows a block diagram of a design of terminal 120, serving sector/base station 110, and active set sector/base station 112 in FIG. 1. At terminal 120, a transmit processor 320 may receive traffic data from a data source 312 and signaling from a controller/processor 330. Transmit processor 320 may process (e.g., encode, interleave, and symbol map) the traffic data, signaling, and pilot and provide data symbols, signaling symbols, and pilot symbols, respectively. As used herein, a data symbol is a symbol for traffic data, a signaling symbol is a symbol for signaling or control information, a pilot symbol is a symbol for pilot, and a symbol is typically a complex value. A modulator (MOD) 322 may perform modulation on the data, signaling, and pilot symbols (e.g., for OFDM) and provide output chips. Each chip may be a complex value in the time domain. A transmitter (TMTR) 324 may condition (e.g., convert to analog, amplify, filter, and upconvert) the output chips and generate a reverse link signal, which may be transmitted via an antenna 326.

At serving sector 110, an antenna 352a may receive the reverse link signals from terminal 120 and other terminals. A receiver (RCVR) 354a may condition (e.g., filter, amplify, downconvert, and digitize) the received signal from antenna 352a and provide samples. A demodulator (DEMOD) 356a may perform demodulation on the samples (e.g., for OFDM) and provide symbol estimates. A receive processor 360a may process (e.g., symbol demap, deinterleave, and decode) the symbol estimates, provide decoded data to a data sink 362a, and provide decoded signaling to a controller/processor 370a.

Sector 112 may similarly receive and process the reverse link signals from terminal 120 and other terminals. The received signal from an antenna 352b may be conditioned by a receiver 354b, demodulated by a demodulator 356b, and processed by a receive processor 360b.

On the forward link, a transmit processor 382a at serving sector 110 may receive and process traffic data from a data source 380a and signaling (e.g., PC commands, PQIs, etc.) from controller/processor 370a. A modulator 384a may perform modulation on data, signaling, and pilot symbols from transmit processor 382a and provide output chips. A transmitter 386a may condition the output chips and generate a forward link signal, which may be transmitted via antenna 352a. Sector 112 may similarly process and transmit traffic data, signaling, and pilot to terminals within its coverage.

At terminal 120, the forward link signals from sectors 110 and 112 and other sectors may be received by antenna 326, conditioned by a receiver 340, demodulated by a demodulator 342, and processed by a receive processor 344. Processor 344 may provide decoded data to a data sink 346 and decoded signaling to controller/processor 330.

Controllers/processors 330, 370a and 370b may direct the operation at terminal 120 and sectors 110 and 112, respectively. Memories 332, 372a and 372b may store data and program codes for terminal 120 and sectors 110 and 112, respectively. Schedulers 374a and 374b may schedule terminals communicating with sectors 110 and 112, respectively, and may assign channels and/or time frequency resources to the terminals.

Figure 4:
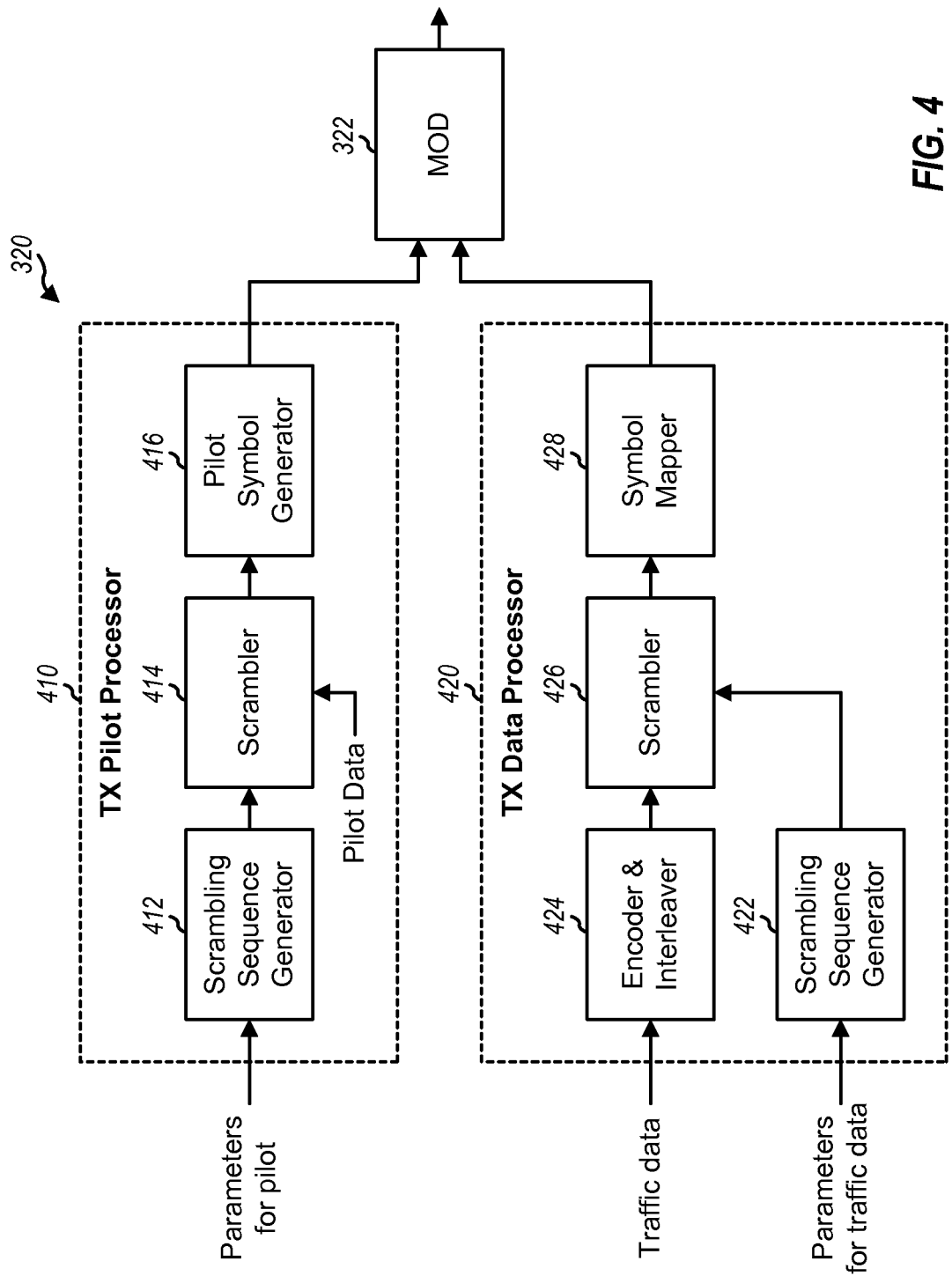
FIG. 4 shows a block diagram of a transmit processor.

FIG. 4 shows a block diagram of a design of transmit processor 320 at terminal 120 in FIG. 3. In this design, transmit processor 320 includes a TX pilot processor 410 and a TX data processor 420.

Within TX pilot processor 410, a generator 412 may receive the set of parameters for the scrambling sequence for the pilot, e.g., the parameters in Table 1. Generator 412 may generate the scrambling sequence for the pilot based on the received set of parameters. A scrambler 414 may scramble pilot data with the scrambling sequence from generator 412 and provide scrambled pilot data. The pilot data may be any known data, e.g., an orthogonal sequence, a sequence of all ones, a known PN sequence, etc. A generator 416 may generate pilot symbols based on the scrambled pilot data and provide the pilot symbols to modulator 322.

Within TX data processor 420, a generator 422 may receive the set of parameters for the scrambling sequence for traffic data, e.g., the parameters in Table 2. Generator 422 may generate the scrambling sequence for traffic data based on the received set of parameters. An encoder and interleaver 424 may receive and encode a packet of traffic data to obtain a coded packet and may further interleave the bits in the coded packet based on an interleaving scheme. A scrambler 426 may scramble the bits from interleaver 424 to randomize the data. A symbol mapper 428 may map the scrambled traffic data to data symbols based on a selected modulation scheme.

Figure 5:
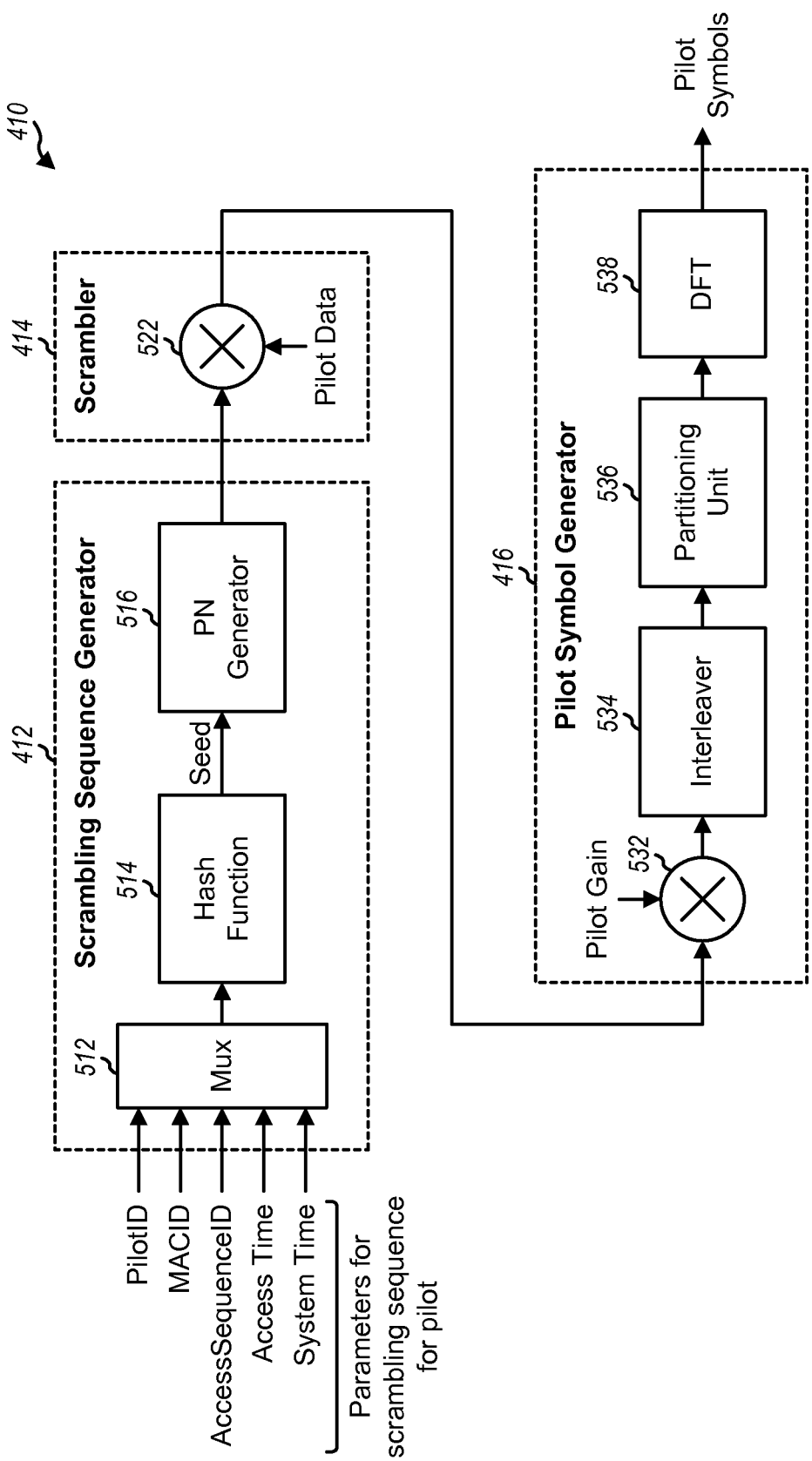
FIG. 5 shows a block diagram of a transmit (TX) pilot processor.

FIG. 5 shows a block diagram of a design of TX pilot processor 410 in FIG. 4. Within scrambling sequence generator 412, a multiplexer (Mux) 512 may receive and concatenate the set of parameters for the scrambling sequence for the pilot, e.g., the parameters in Table 1. A hash function 514 may receive and hash the concatenated set of parameters and provide a hash digest. The hash digest may have a fixed size (e.g., 20 bits) and may be used as a seed for a PN generator 516. PN generator 516 may be initialized with the seed and may provide a pseudo-random chip sequence as the scrambling sequence. Within scrambler 414, a multiplier 522 may perform chip-by-chip multiply of the pilot data with the scrambling sequence and provide scrambled pilot data. In one design, the pilot data is a sequence of L ones, the scrambling sequence is a pseudo-random sequence of L chips, and the scrambled pilot data is the pseudo-random sequence of L chips. The pilot data may also be other orthogonal sequence or other known data.

Within pilot symbol generator 416, a multiplier 532 may scale each chip from scrambler 414 with a gain for the R-PICH. An interleaver 534 may permute the sequence of chips from multiplier 532. In one design, the pilot is transmitted in a CDMA subsegment of M subcarriers in N OFDM symbol periods, as shown in FIG. 2. A unit 536 may partition the chip sequence from interleaver 534 into N subsequences, with each subsequence including M chips. In each OFDM symbol period of the CDMA subsegment, a discrete Fourier transform (DFT) unit 538 may perform an M-point DFT on the M chips in the subsequence for that OFDM symbol period and provide M pilot symbols for the N subcarriers in the OFDM symbol period.

As noted above, multiple terminals may transmit different channels in the same CDMA subsegment using CDM. Terminal 120 may send a $\log_2(L)$-bit value on a channel in the CDMA subsegment by (i) mapping this value to an L-chip Walsh sequence and (ii) scrambling the L-chip Walsh sequence with an L-chip scrambling sequence to obtain an L-chip pseudo-random sequence. This pseudo-random sequence may be superimposed with other pseudo-random sequences from other terminals and/or other channels in the CDMA subsegment. This superposition constitutes the CDM.

Scrambling sequence generator 422 and scrambler 426 for TX data processor 420 in FIG. 4 may be implemented in similar manner as scrambling sequence generator 412 and scrambler 414, respectively, in FIG. 5. However, the hash function within scrambling sequence generator 422 may generate a seed based on a different set of parameters for traffic data, e.g., the parameters in Table 2.

A sector may receive pilots from any number of terminals. The sector may have the set of parameters for the scrambling sequence for the pilot for each terminal to be received by the sector. The sector may receive and process the pilot sent by each terminal based on the scrambling sequence used by that terminal for the pilot.

Figure 6:
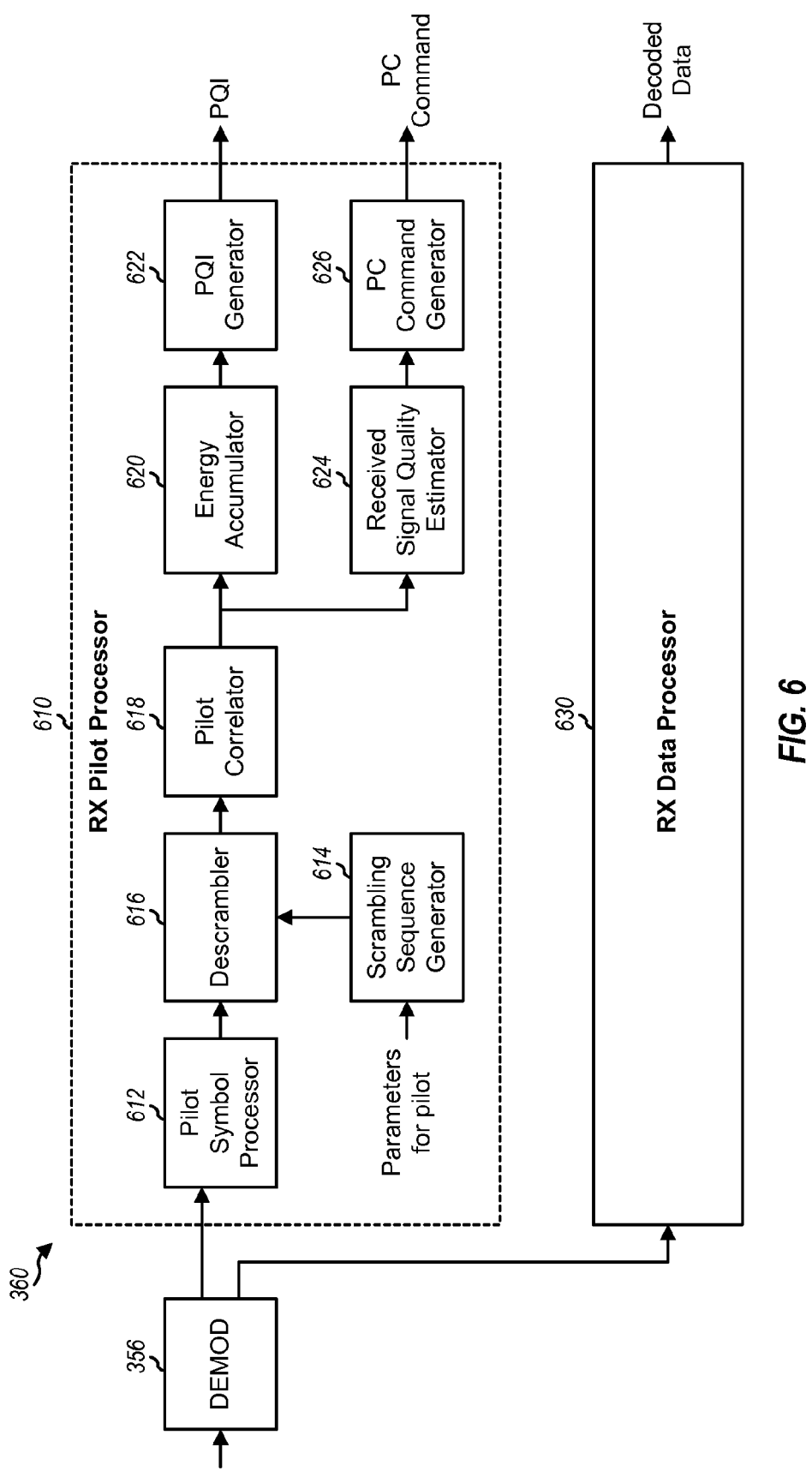
FIG. 6 shows a block diagram of a receive processor.

FIG. 6 shows a block diagram of a design of receive processor 360, which may be used for receive processors 360a and 360b in FIG. 3. Receive processor 360 includes a receive (RX) pilot processor 610 and an RX data processor 630.

Within RX pilot processor 610, a pilot symbol processor 612 may obtain received symbols for a CDMA subsegment and may process these received symbols in a manner complementary to the processing by pilot symbol generator 416 in FIG. 5. Processor 612 may perform an M-point inverse DFT (IDFT) on M received symbols for each OFDM symbol period to obtain M input samples. Processor 612 may then assemble the input samples for the N OFDM symbol periods of the CDMA subsegment to obtain a sequence of L input samples.

A scrambling sequence generator 614 may generate the scrambling sequence for the pilot for terminal 120 based on the set of parameters used by terminal 120 for the pilot. Generator 614 may be implemented with generator 412 in FIG. 5. A descrambler 616 may descramble the sequence of input samples with the scrambling sequence and provide a descrambled sequence. A pilot correlator 618 may correlate the descrambled sequence with the pilot data. An energy accumulator 620 may accumulate the energies of all samples from pilot correlator 618. The pilot from terminal 120 may be received via one or more signal paths. RX pilot processor 610 may perform processing for each signal path of interest and may then combine the energies of all signal paths to obtain the received pilot strength for terminal 120. A PQI generator 622 may obtain the received pilot strength and determine a PQI for terminal 120. An estimator 624 may estimate the received signal quality for terminal 120. A generator 626 may generate a PC command for terminal 120 based on the received signal quality. The PC command and PQI may be sent to terminal 120.

RX data processor 630 may process received symbols for traffic data in a manner complementary to the processing by TX data processor 420 in FIG. 4. Processor 630 may generate a scrambling sequence for traffic data based on the set of parameters used by terminal 120 for traffic data. Processor 630 may then perform descrambling for traffic data with this scrambling sequence.

FIG. 7 shows a design of a process 700 for transmitting pilot by terminal 120. A scrambling sequence may be generated based on a set of parameters comprising at least one static parameter and possibly at least one dynamic parameter (block 712). The at least one static parameter has fixed value for an entire communication session for the terminal. The at least one static parameter may be determined during initial system access by the terminal and may be independent of the serving sector for the terminal. The at least one static parameter may include at least one of an ID of a sector initially accessed by the terminal, an ID assigned to the terminal by the initial accessed sector, an access sequence index used by the terminal for the initial system access, and time of the initial system access by the terminal. The at least one dynamic parameter has variable value during the communication session and may include a parameter for system time. The parameter for system time may include a superframe index for a superframe in which the pilot is sent and/or a frame index for a frame within the superframe in which the pilot is sent. For block 712, the set of parameters may be hashed to obtain a seed, and the scrambling sequence may be generated based on the seed.

A pilot may be generated based on the scrambling sequence (block 714). For block 714, pilot data may be scrambled with the scrambling sequence to obtain scrambled pilot data. Pilot symbols may be generated based on the scrambled pilot data and may be mapped to a time frequency block used to send the pilot. The pilot data may comprise an orthogonal sequence or some other known data. The pilot may comprise the pilot symbols. The time frequency block may be for a CDMA subsegment used by different terminals to send pilots and/or other information on the reverse link.

The pilot may be sent to at least one sector including the serving sector for the terminal (block 716). The at least one sector may be in an active set of the terminal. A PC command determined based on the pilot may be received from the serving sector (block 718). Transmit power of the terminal may be adjusted based on the PC command (block 720). A PQI determined based on the pilot may be received from each of the at least one sector (block 722). One of the at least one sector may be selected as the serving sector based on the PQI received from each sector (block 724). The terminal may be handed off from the serving sector to a new serving sector. The same set of parameters may be used to generate the scrambling sequence for the pilot sent to the new serving sector.

FIG. 8 shows a design of an apparatus 800 for transmitting pilot. Apparatus 800 includes means for generating a scrambling sequence based on a set of parameters comprising at least one static parameter and possibly at least one dynamic parameter (module 812), means for generating a pilot based on the scrambling sequence (module 814), means for sending the pilot to at least one sector including the serving sector for the terminal (module 816), means for receiving a PC command determined based on the pilot from the serving sector (module 818), means for adjusting transmit power of the terminal based on the PC command (module 820), means for receiving a PQI determined based on the pilot from each of the at least one sector (module 822), and means for selecting one of the at least one sector as the serving sector based on the PQI received from each sector (module 824).

FIG. 9 shows a design of a process 900 for receiving pilot by a sector. A pilot may be received from the terminal, e.g., from a time frequency block used for sending the pilot on the reverse link (block 912). A scrambling sequence for the terminal may be generated based on a set of parameters comprising at least one static parameter and possibly at least one dynamic parameter (block 914). The set of parameters may be hashed to obtain a seed, and the scrambling sequence may be generated based on the seed. The received pilot may be descrambled with the scrambling sequence to obtain descrambled pilot for the terminal (block 916).

Received pilot strength for the terminal may be determined based on the descrambled pilot (block 918). A PQI may be generated based on the received pilot strength (block 920) and sent to the terminal (block 922). If the sector is the serving sector for the terminal, then received signal quality for the terminal may be determined based on the descrambled pilot (block 924). A PC command may be generated based on the received signal quality (block 926) and sent to the terminal (block 928).

FIG. 10 shows a design of an apparatus 1000 for receiving pilot. Apparatus 1000 includes means for receiving a pilot from the terminal (module 1012), means for generating a scrambling sequence for the terminal based on a set of parameters comprising at least one static parameter and possibly at least one dynamic parameter (module 1014), means for descrambling the received pilot with the scrambling sequence to obtain descrambled pilot for the terminal (module 1016), means for determining received pilot strength for the terminal based on the descrambled pilot (module 1018), means for generating a PQI based on the received pilot strength (module 1020), means for sending the PQI to the terminal (module 1022), means for determining received signal quality for the terminal based on the descrambled pilot (module 1024), means for generating a PC command based on the received signal quality (module 1026), and means for sending the PC command to the terminal (module 1028).

FIG. 11 shows a design of a process 1100 for transmitting pilot and traffic data by terminal 120. A first scrambling sequence may be generated based on a first set of parameters (block 1112). The first set of parameters may be hashed to obtain a first seed, and the first scrambling sequence may be generated based on the first seed. A pilot may be generated based on the first scrambling sequence (block 1114). The pilot may be sent to at least one sector including the serving sector for the terminal (block 1116).

A second scrambling sequence may be generated based on a second set of parameters (block 1118). The second set of parameters may be hashed to obtain a second seed, and the second scrambling sequence may be generated based on the second seed. Traffic data may be scrambled based on the second scrambling sequence to obtain scrambled traffic data (block 1120). The scrambled traffic data may be sent to the serving sector (block 1122).

The first set may include at least one parameter independent of the serving sector. The first set may include at least one of an ID of a sector initially accessed by the terminal, an ID assigned to the terminal by the initial accessed sector, an access sequence index used by the terminal for initial system access, and time of the initial system access by the terminal. The second set may include at least one parameter dependent on the serving sector. The second set may include at least one of an ID of the serving sector and an ID assigned to the terminal by the serving sector. The first and second sets may each include a parameter for system time, which may include (i) a superframe index for a superframe in which pilot or traffic data is sent and/or (ii) a frame index for a frame within the superframe in which the pilot or traffic data is sent. The first and second sets may also include other parameters.

FIG. 12 shows a design of an apparatus 1200 for transmitting pilot and traffic data. Apparatus 1200 includes means for generating a first scrambling sequence based on a first set of parameters (module 1212), means for generating a pilot based on the first scrambling sequence (module 1214), means for sending the pilot to at least one sector including the serving sector for the terminal (module 1216), means for generating a second scrambling sequence based on a second set of parameters (module 1218), means for scrambling traffic data based on the second scrambling sequence to obtain scrambled traffic data (module 1220), and means for sending the scrambled traffic data to the serving sector (module 1222).

FIG. 13 shows a design of a process 1300 for receiving pilot and traffic data by a sector. A pilot may be received from the terminal (block 1312). A first scrambling sequence may be generated based on a first set of parameters, which may include any of the parameters in Table 1 (block 1314). The first set of parameters may be hashed to obtain a first seed, and the first scrambling sequence may be generated based on the first seed. The received pilot may be descrambled with the first scrambling sequence to obtain descrambled pilot (block 1316).

Traffic data may also be received from the terminal (block 1318). A second scrambling sequence may be generated based on a second set of parameters, which may include any of the parameters in Table 2 (block 1320). The second set of parameters may be hashed to obtain a second seed, and the second scrambling sequence may be generated based on the second seed. The received traffic data may be descrambled with the second scrambling sequence to obtain descrambled traffic data (block 1322).

FIG. 14 shows a design of an apparatus 1400 for receiving pilot and traffic data. Apparatus 1400 includes means for receiving a pilot from a terminal (module 1412), means for generating a first scrambling sequence based on a first set of parameters (module 1414), means for descrambling the received pilot with the first scrambling sequence to obtain descrambled pilot (module 1416), means for receiving traffic data from the terminal (module 1418), means for generating a second scrambling sequence based on a second set of parameters (module 1420), and means for descrambling the received traffic data with the second scrambling sequence to obtain descrambled traffic data (module 1422).

The modules in FIGS. 8, 10, 12 and 14 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units used to perform the techniques at an entity (e.g., a terminal or a base station) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 332, 372a or 372b in FIG. 3) and executed by a processor (e.g., processor 330, 370a or 370b). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to:
generate a scrambling sequence based on a set of parameters comprising at least one static parameter and at least one dynamic parameter, each of the at least one dynamic parameter having a variable value during a communication session for a terminal, the at least one dynamic parameter comprising a parameter for a system time,
generate a pilot based on the scrambling sequence, and
send the pilot from the terminal to at least one sector, wherein said system time is indicative of time at which said pilot is sent; and
a memory coupled to the at least one processor.

2. The apparatus of claim 1, wherein the at least one processor is configured to hash the set of parameters to obtain a seed and to generate the scrambling sequence based on the seed.

3. The apparatus of claim 1, wherein the at least one processor is configured to scramble pilot data with the scrambling sequence to obtain scrambled pilot data, to generate pilot symbols based on the scrambled pilot data, and to map the pilot symbols to a time frequency block used to send the pilot.

4. The apparatus of claim 1, wherein the at least one processor is configured to generate a seed based on the set of parameters and to generate the scrambling sequence based on the seed.

5. The apparatus of claim 1, wherein the at least one processor is configured to generate the pilot based further on pilot data comprising an orthogonal sequence, and to send the pilot in a time frequency block for a Code Division Multiple Access (CDMA) subsegment used by multiple terminals to send pilots on reverse link.

6. The apparatus of claim 1, wherein each of the at least one static parameter has a fixed value for an entire communication session for the terminal.

7. The apparatus of claim 1, wherein the at least one static parameter comprises a parameter that is independent of a serving sector for the terminal.

8. The apparatus of claim 1, wherein the at least one processor is configured to obtain the at least one static parameter after completing initial system access by the terminal.

9. The apparatus of claim 1, wherein the at least one static parameter comprises an identifier (ID) of a sector initially accessed by the terminal, or an ID assigned to the terminal by the initial accessed sector, or an access sequence index used by the terminal for initial system access, or time of the initial system access by the terminal, or a combination thereof.

10. The apparatus of claim 1, wherein the at least one processor is configured to generate at least one Single-Carrier Frequency Division Multiple Access (SC-FDMA) symbol for the pilot.

11. The apparatus of claim 1, wherein said parameter for said system time comprises a predetermined number of least significant bits (LSBs) of a frame index of a frame in which said pilot is sent.

12. The apparatus of claim 1, wherein said parameter for said system time comprises a superframe index for a superframe in which the pilot is sent.

13. The apparatus of claim 1, wherein said parameter for said system time comprises a frame index for a frame in which the pilot is sent.

14. The apparatus of claim 1, wherein the at least one processor is configured to receive a power control (PC) command from a serving sector for the terminal, the PC command being determined based on the pilot, and to adjust transmit power based on the PC command.

15. The apparatus of claim 1, wherein the at least one processor is configured to receive a pilot quality indicator (PQI) from each of the at least one sector, the PQI from each sector being determined based on the pilot, and to select one of the at least one sector as a serving sector for the terminal based on the PQI received from each of the at least one sector.

16. The apparatus of claim 1, wherein the at least one processor is configured to perform handoff from a current serving sector to a new serving sector, and to use the set of parameters to generate the scrambling sequence for pilot sent to the new serving sector.

17. A method implemented in an apparatus for wireless communication, comprising:
generating, via the apparatus, a scrambling sequence based on a set of parameters comprising at least one static parameter and at least one dynamic parameter, each of the at least one dynamic parameter having a variable value during a communication session for a terminal, the at least one dynamic parameter comprising a parameter for a system time;
generating, via the apparatus, a pilot based on the scrambling sequence; and
sending, via the apparatus, the pilot from the terminal to at least one sector, wherein said system time is indicative of time at which said pilot is sent.

18. The method of claim 17, wherein the generating the scrambling sequence comprises
generating a seed based on the set of parameters, and
generating the scrambling sequence based on the seed.

19. The method of claim 17, wherein the at least one static parameter comprises a parameter that is independent of a serving sector for the terminal.

20. The method of claim 17, wherein said parameter for said system time comprises a frame index of a frame in which said pilot is sent.

21. An apparatus for wireless communication, comprising:
means for generating a scrambling sequence based on a set of parameters comprising at least one static parameter and at least one dynamic parameter, each of the at least one dynamic parameter having a variable value during a communication session for a terminal, the at least one dynamic parameter comprising a parameter for a system time;
means for generating a pilot based on the scrambling sequence; and
means for sending the pilot from the terminal to at least one sector, wherein said system time is indicative of time at which said pilot is sent.

22. The apparatus of claim 21, wherein the at least one static parameter comprises a parameter that is independent of a serving sector for the terminal.

23. The apparatus of claim 21, wherein the means for generating the scrambling sequence comprises
means for generating a seed based on the set of parameters, and
means for generating the scrambling sequence based on the seed.

24. A non-transitory processor-readable storage medium having program code, which when executed by at least one processor, results in the at least one processor performing functions of:
generating a scrambling sequence based on a set of parameters comprising at least one static parameter and at least one dynamic parameter, each of the at least one dynamic parameter having a variable value during a communication session for a terminal, the at least one dynamic parameter comprising a parameter for a system time;
generating a pilot based on the scrambling sequence; and
sending the pilot to at least one sector, wherein said system time is indicative of time at which said pilot is sent.

25. An apparatus for wireless communication, comprising:
at least one processor configured to:
receive a pilot from a terminal,
generate a scrambling sequence for the terminal based on a set of parameters comprising at least one static parameter and at least one dynamic parameter, each of the at least one dynamic parameter having a variable value during a communication session for the terminal, the at least one dynamic parameter comprising a parameter for a system time indicative of time at which said pilot is sent by said terminal, and
descramble the received pilot with the scrambling sequence to obtain descrambled pilot for the terminal; and
a memory coupled to the at least one processor.

26. The apparatus of claim 25, wherein the at least one processor is configured to generate a seed based on the set of parameters and to generate the scrambling sequence based on the seed.

27. The apparatus of claim 25, wherein said parameter for said system time comprises a frame index of a frame in which said pilot is sent by said terminal.

28. The apparatus of claim 25, wherein the at least one static parameter comprises an identifier (ID) of a sector initially accessed by the terminal, or an ID assigned to the terminal by the initial accessed sector, or an access sequence index used by the terminal for initial system access, or time of the initial system access by the terminal, or a combination thereof.

29. The apparatus of claim 25, wherein the at least one processor is configured to determine received pilot strength for the terminal based on the descrambled pilot, to generate a pilot quality indicator (PQI) based on the received pilot strength, and to send the PQI to the terminal.

30. The apparatus of claim 25, wherein the at least one processor is configured to determine received signal quality for the terminal based on the descrambled pilot, to generate a power control (PC) command based on the received signal quality, and to send the PC command to the terminal.

31. A method implemented in an apparatus for wireless communication, comprising:
receiving, via the apparatus, a pilot from a terminal;
generating, via the apparatus, a scrambling sequence for the terminal based on a set of parameters comprising at least one static parameter and at least one dynamic parameter, each of the at least one dynamic parameter having a variable value during a communication session for the terminal, the at least one dynamic parameter comprising a parameter for a system time indicative of time at which said pilot is sent by said terminal; and
descrambling, via the apparatus, the received pilot with the scrambling sequence to obtain descrambled pilot for the terminal.

32. The method of claim 31, wherein the generating the scrambling sequence comprises
generating a seed based on the set of parameters, and
generating the scrambling sequence based on the seed.

33. The method of claim 31, wherein said parameter for said system time comprises a frame index of a frame in which said pilot is sent by said terminal.

34. An apparatus for wireless communication, comprising:
at least one processor configured to:
generate a first scrambling sequence based on a first set of parameters,
generate a pilot based on the first scrambling sequence,
send the pilot to at least one sector including a serving sector for a terminal,
generate a second scrambling sequence based on a second set of parameters different from the first set of parameters,
scramble traffic data based on the second scrambling sequence to obtain scrambled traffic data, and
send the scrambled traffic data to the serving sector, which at least one of the first and second sets of parameters comprise a parameter for system time indicative of time at which said pilot or said traffic data is sent; and
a memory coupled to the at least one processor.

35. The apparatus of claim 34, wherein the at least one processor is configured to generate a first seed based on the first set of parameters, to generate the first scrambling sequence based on the first seed, to generate a second seed based on the second set of parameters, and to generate the second scrambling sequence based on the second seed.

36. The apparatus of claim 34, wherein the first set of parameters comprises at least one parameter independent of the serving sector, and wherein the second set of parameters comprises at least one parameter dependent on the serving sector.

37. The apparatus of claim 34, wherein said parameter for said system time comprises a frame index of a frame in which said pilot or said traffic data is sent.

38. The apparatus of claim 37, wherein said parameter for said system time further comprises a superframe index for a superframe in which said pilot or said traffic data is sent.

39. The apparatus of claim 34, wherein the first set of parameters comprises an identifier (ID) of a sector initially accessed by the terminal, or an ID assigned to the terminal by the initial accessed sector, or an access sequence index used by the terminal for initial system access, or time of the initial system access by the terminal, or a combination thereof.

40. The apparatus of claim 34, wherein the second set of parameters comprises an identifier (ID) of the serving sector, or an ID assigned to the terminal by the serving sector, or both.

41. A method implemented in an apparatus for wireless communication, comprising:
generating, via the apparatus, a first scrambling sequence based on a first set of parameters;
generating, via the apparatus, a pilot based on the first scrambling sequence;
sending, via the apparatus, the pilot to at least one sector including a serving sector for a terminal;
generating, via the apparatus, a second scrambling sequence based on a second set of parameters different from the first set of parameters;
scrambling, via the apparatus, traffic data based on the second scrambling sequence to obtain scrambled traffic data; and
sending, via the apparatus, the scrambled traffic data to the serving sector, wherein at least one of said first and second sets of parameters comprise a parameter for system time indicative of time at which said pilot or said traffic data is sent.

42. The method of claim 41, wherein the generating the first scrambling sequence comprises generating a first seed based on the first set of parameters, and generating the first scrambling sequence based on the first seed, and wherein the generating the second scrambling sequence comprises generating a second seed based on the second set of parameters, and generating the second scrambling sequence based on the second seed.

43. The method of claim 41, wherein said parameter for said system time comprises a frame index of a frame in which said pilot or said traffic data is sent.

44. An apparatus for wireless communication, comprising:
at least one processor configured to:
receive a pilot from a terminal,
generate a first scrambling sequence based on a first set of parameters,
descramble the received pilot with the first scrambling sequence to obtain descrambled pilot,
receive traffic data from the terminal,
generate a second scrambling sequence based on a second set of parameters different from the first set of parameters, and
descramble the received traffic data with the second scrambling sequence to obtain descrambled traffic data, wherein at least one of said first and second sets of parameters comprise a parameter for system time indicative of time at which said pilot or said traffic data is sent by said terminal; and
a memory coupled to the at least one processor.

45. The apparatus of claim 44, wherein the at least one processor is configured to generate a first seed based on the first set of parameters, to generate the first scrambling sequence based on the first seed, to generate a second seed based on the second set of parameters, and to generate the second scrambling sequence based on the second seed.

46. The apparatus of claim 44, wherein the first set of parameters comprises at least one parameter independent of the serving sector for the terminal, and wherein the second set of parameters comprises at least one parameter dependent on the serving sector.

47. The apparatus of claim 44, wherein said parameter for said system time comprises a frame index of a frame in which said pilot or said traffic data is sent by said terminal.

48. A method for wireless communication, comprising:
receiving a pilot from a terminal;
generating a first scrambling sequence based on a first set of parameters different from the first set of parameters;
descrambling the received pilot with the first scrambling sequence to obtain descrambled pilot;
receiving traffic data from the terminal;
generating a second scrambling sequence based on a second set of parameters; and
descrambling the received traffic data with the second scrambling sequence to obtain descrambled traffic data, wherein at least one of said first and second sets of parameters comprise a parameter for system time indicative of time at which said pilot or said traffic data is sent by said terminal.

49. The method of claim 48, wherein the generating the first scrambling sequence comprises generating a first seed based on the first set of parameters, and generating the first scrambling sequence based on the first seed, and wherein the generating the second scrambling sequence comprises generating a second seed based on the second set of parameters, and generating the second scrambling sequence based on the second seed.

* * * * *